March 8, 1932.  J. A. REASONER  1,848,976
TANK CAP LOCK
Filed Jan. 19, 1931
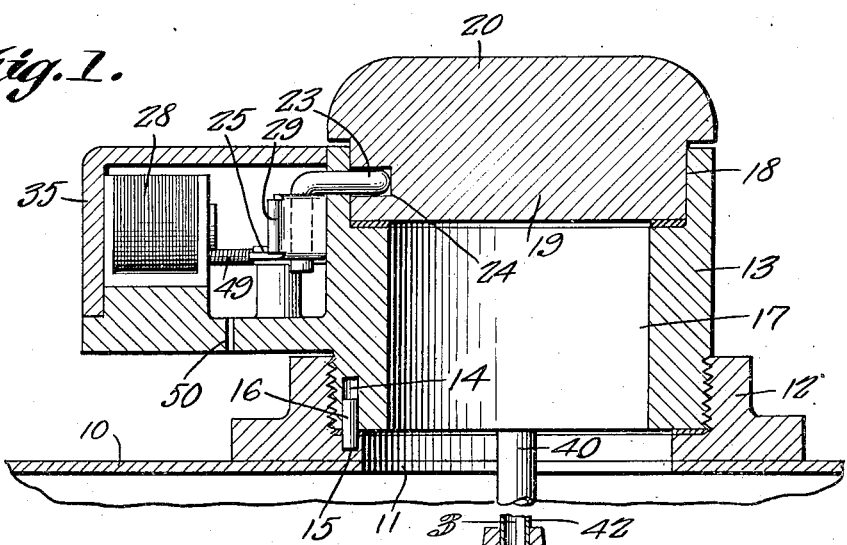
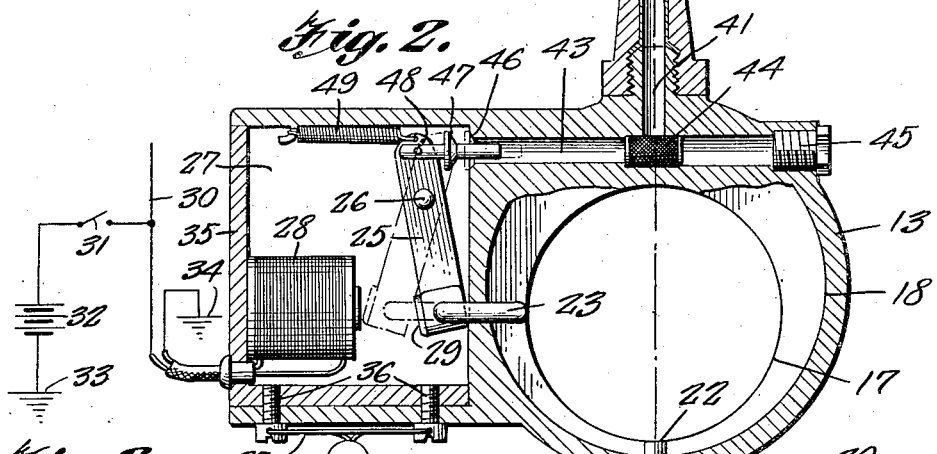
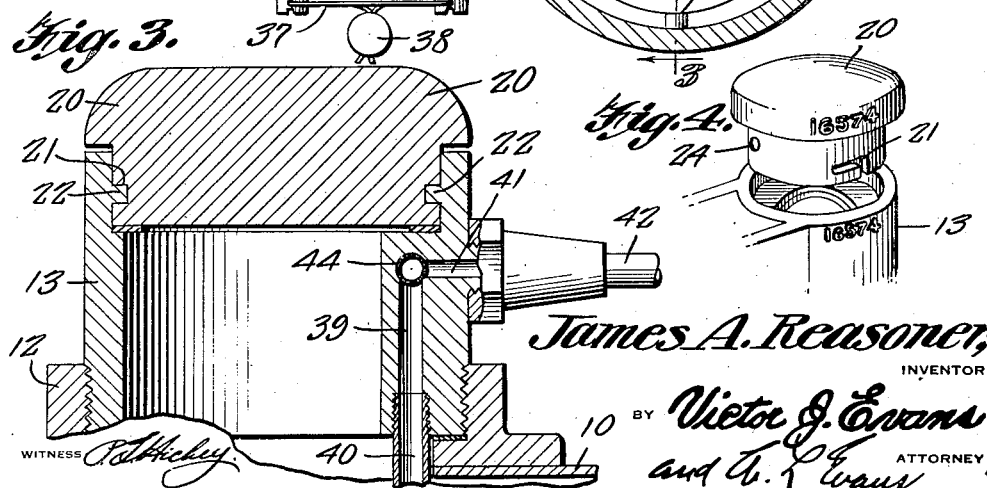
James A. Reasoner,
INVENTOR Patented Mar. 8, 1932

1,848,976

UNITED STATES PATENT OFFICE

JAMES A. REASONER, OF LANCASTER, OHIO

TANK CAP LOCK

Application filed January 19, 1931. Serial No. 509,791.

This invention relates to means for locking the caps of automobile fuel supply tanks, an object being to automatically lock the cap when the ignition switch of the automobile is open, and to automatically release the cap when the switch is closed, so as to prevent unauthorized removal of fuel from the tank.

Another object of the invention is the provision of means operating in conjunction with the cap locking means to prevent feeding fuel from the tank to the engine when the ignition switch is open, so that the cap locking means and fuel feeding means may be controlled through the operation of the switch.

With the above and other objects in view, the invention further includes the following novel features and details of construction, to be hereinafter more fully described, illustrated in the accompanying drawings and pointed out in the appended claim.

In the drawings:—

Figure 1 is a vertical sectional view showing a fragmentary portion of a tank with the invention applied.

Figure 2 is a horizontal sectional view showing the wiring circuit in diagram.

Figure 3 is a vertical sectional view taken substantially on the line 3—3 of Figure 2.

Figure 4 is a fragmentary perspective view showing the cap removed.

Referring to the drawings in detail wherein like characters of reference denote corresponding parts, the reference character 10 indicates a portion of a tank, such as the fuel supply tank of an automobile. This tank is provided with a filling opening 11 which is surrounded by an internally threaded flange 12 and threadedly secured within this flange is a collar 13. The collar is locked against removal from the flange, and for this purpose the collar is provided with a socket 14 which registers with a socket 15 provided in the flange 12, a hardened steel pin 16 being positioned within these sockets. The flange 12 and collar 13 constitute a filling neck.

The sleeve 13 must be attached before the tank is applied to the automobile, as the parts must be inverted so that the pin 16 will be entirely within the socket 14 and permit of rotation of the sleeve. With the parts in their normal position, the pin 16 will be partially within the socket 14 and partially within the socket 15 so that the sleeve will be held against rotation.

The sleeve 13 is provided with an eccentrically arranged bore or passage 17, through which fuel is placed within the tank 10, and the sleeve is counterbored as shown at 18 to receive the reduced portion 19 of a closure cap 20. This cap is provided with oppositely arranged bayonet slots 21 which are adapted to receive pins 22 extending inwardly from diametrically opposite sides of the counterbore 18 so that the cap will be removably held in place.

In order to lock the cap against unauthorized removal, the invention provides a plunger 23 which operates through the sleeve 13 and is engageable within an opening 24 provided in the cap 20. This plunger is carried at one end of an arm 25 which is pivotally mounted as shown at 26 within a compartment 27 which is disposed at one side of the sleeve 13. This compartment also accommodates an electromagnet 28 and the arm 25 carries an armature 29 which is located within the field of the magnet.

The magnet is connected through the medium of a conductor 30 with the ignition circuit of an automobile, the ignition switch being indicated at 31, while the battery is indicated at 32. The battery ground is indicated at 33 while the magnet is grounded as at 34.

By closing the ignition switch 31, the magnet will be energized, whereupon the plunger 23 will be withdrawn from its engagement with the cap 13 to permit the latter to be removed.

In order to prevent tampering with the mechanism within the compartment 27, the latter is closed by a substantially L-shaped closure 35 to which the magnet 28 is attached. This closure has one arm extending within the compartment 27 and is held therein through the medium of screws 36, the latter extending through one wall of the compartment and being held against rotation by means of a wire 27 which passes through the heads of the screws with its ends connected by a seal 38. This seal may have secured thereon the date of application, as well as the name of the manufacturer of the device or other indicia, while the sleeve 13 and the cap 26 may be given like serial numbers as shown in Figure 4 of the drawings.

In addition to controlling the cap locking mechanism, the present invention controls the fuel feed through the operation of the ignition system. For this purpose, the sleeve 13 is provided with a vertically disposed passage 39 whose lower end is in communication with a pipe 40 which extends downward into the tank 10. The upper end of this passage communicates with a horizontal passage 41 which in turn is in communication with the fuel supply pipe 42 through which fuel is supplied to the engine. An additional horizontal passage 43 communicates with the passages 39 and 41, and at the juncture of these passages there is provided a screen 44. The outer end of the passage 43 is closed by a plug 45. The inner end of this passage 43 is provided with a seat 46 which is adapted to receive a valve 47, the stem of which extends into the passage 43. This valve 47 is pivotally connected as shown at 48 to the arm 25, a spring 49 acting to keep the valve 47 from its seat. This spring also acts to force the plunger 23 inward to lock the cap.

By reference to Figure 2 of the drawings it will be seen that when the ignition switch 31 is open, the plunger 23 will be positioned to lock the cap 20 in place. As the valve 47 is unseated, any attempt to start operation of the engine with the switch off would only result in sucking air through the passage 43, air being admitted to the compartment 27 through a vent 50. However, the ignition switch 31 is closed, the electromagnet 28 will be energized to attract the armature 29, so that the cap will be released and the valve 47 will be seated to permit the fuel supply to function in the ordinary manner.

The invention is susceptible of various changes in its form, proportions and minor details of construction and the right is herein reserved to make such changes as properly fall within the scope of the appended claim.

Having described the invention what is claimed is:—

In combination with a fuel supply structure including a tank having a filling neck and a cap for the filling neck, a plunger to lock the cap in closed position, a vent for the fuel supply to interrupt the flow of fuel from the tank, a valve to close said vent, means for connecting the valve and plunger to provide for their simultaneous operation, and electro-magnetic means normally in open circuit to control said valve and plunger.

In testimony whereof I affix my signature.

JAMES A. REASONER.